May 6, 1969

G. O. HUNTZINGER 3,443,112

ELECTRIC CRANKING MOTOR AUTOMATIC DISCONNECT CIRCUIT

Filed Dec. 9, 1965

INVENTOR.
GERALD O. HUNTZINGER
BY
Richard G. Stahr
HIS ATTORNEY

INVENTOR.
GERALD O. HUNTZINGER
BY Richard G. Stahr
HIS ATTORNEY

United States Patent Office 3,443,112
Patented May 6, 1969

3,443,112
ELECTRIC CRANKING MOTOR AUTOMATIC DISCONNECT CIRCUIT
Gerald O. Huntzinger, Anderson, Ind., assignor to General Motors Corporation, Detroit, Mich., a corporation of Delaware
Filed Dec. 9, 1965, Ser. No. 513,162
Int. Cl. F02n 11/08, 11/14; H02p 9/04
U.S. Cl. 290—38                                                    4 Claims

ABSTRACT OF THE DISCLOSURE

An electric cranking motor automatic disconnect circuit wherein the energizing circuit for the cranking motor is completed upon the closure of a pair of normally open auxiliary relay contacts. An electrical signal of a frequency which is a function of engine speed is applied across a frequency sensitive network included in the energizing circuit of the operating coil of a second relay having a pair of normally closed contacts which are connected in series with the armature of the cranking motor in one embodiment and in series with the operating coil of the auxiliary relay in another embodiment.

---

This invention relates to an electric cranking motor automatic disconnect circuit and, more specifically, to an electric cranking motor automatic disconnect circuit which is responsive to the frequeny of an electric potential signal.

Electric cranking motors are frequently employed to start internal combustion engines of various types. To prevent damage to the engine and the cranking motor, it is mandatory that the cranking motor be disengaged from the engine upon starting.

It is equally important that the cranking motor remain disengaged from the engine while the engine is in the running mode. Therefore, a circuit which will disconnect the electric cranking motor from the electric energizing source when the engine starts and which will maintain the cranking motor energizing circuit open while the engine is running, to prevent inadvertent engagement of the cranking motor and the engine, is a desirable feature.

It is, therefore, an object of this invention to provide an improved electric cranking motor automatic disconnect circuit.

It is another object of this invention to provide an improved electric cranking motor automatic disconnect circuit which is responsive to a predetermined frequency of an electrical potential signal.

It is another object of this invention to provide an improved electric cranking motor automatic disconnect circuit which is responsive to a predetermined frequency of an electrical potential signal which has a frequency which is a function of engine speed.

In accordance with this invention, the energizing circuit of an electric cranking motor is interrupted by a frequency sensing circuit interrupting arrangement which is responsive to an electrical potential signal having a frequency which is a function of engine speed.

Figure 1:
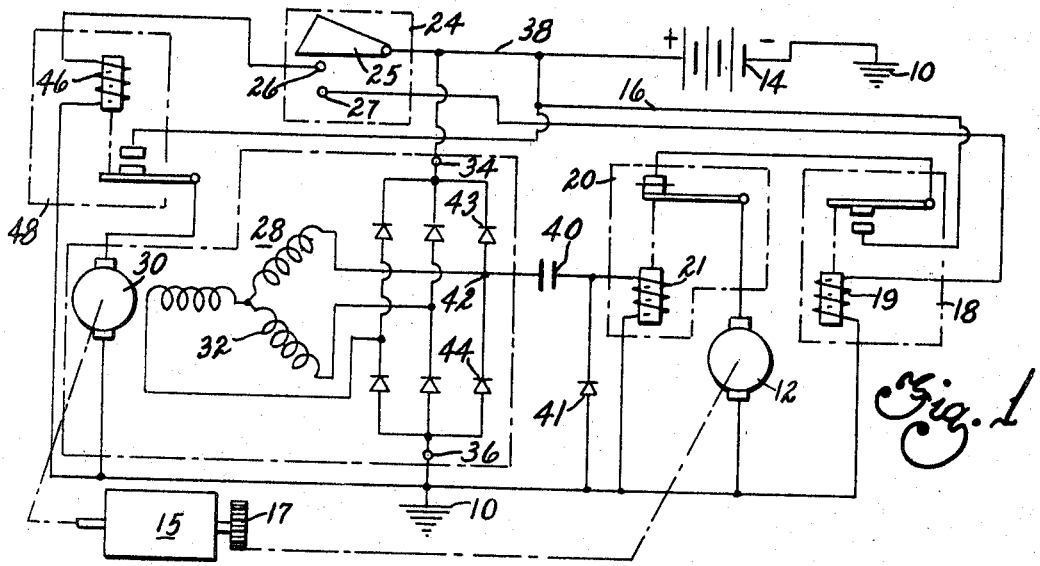
Figure 2:
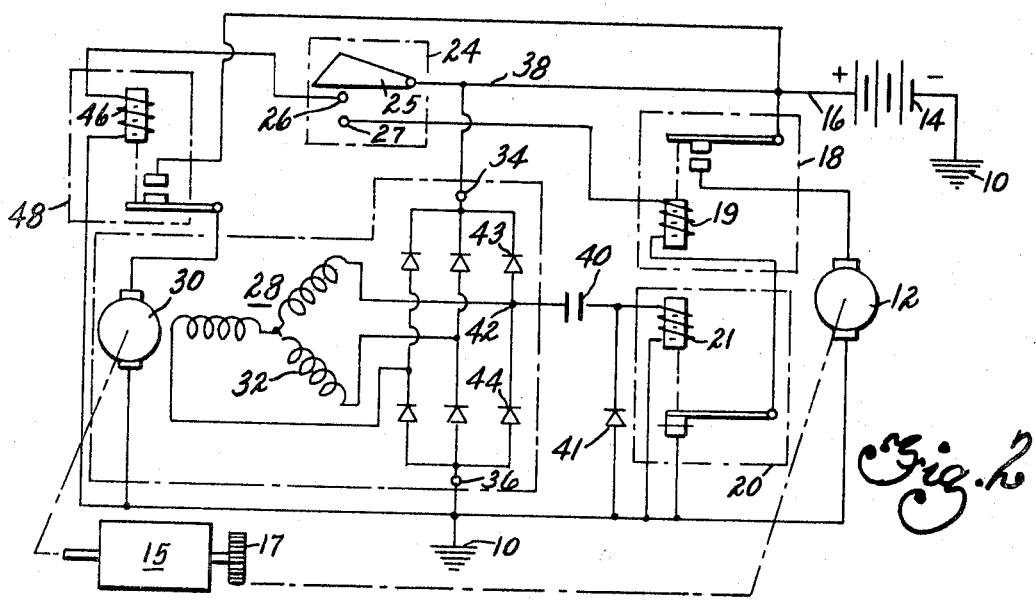
Figure 3:
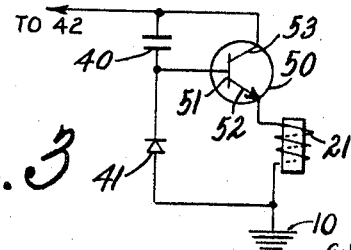
Figure 4A:
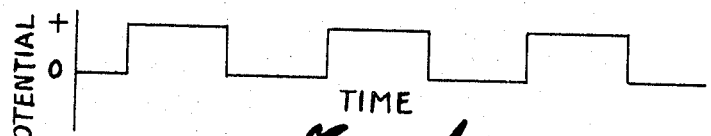
Figure 4B:
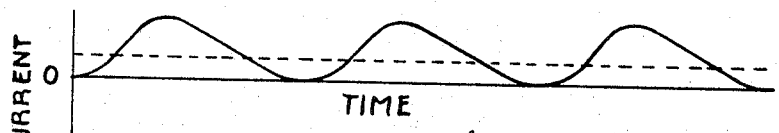
Figure 4C:
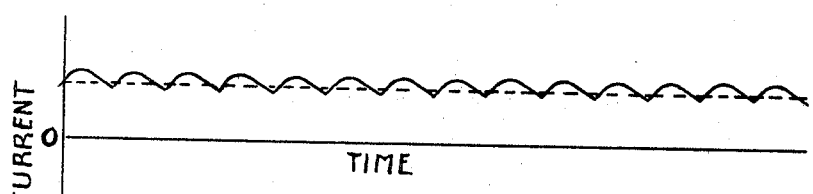
Figure 5:
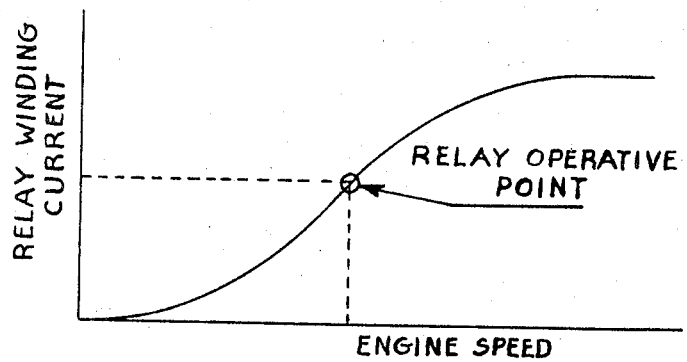

For a better understanding of the present invention together with additional objects, advantages and features thereof, reference is made to the following description and accompanying drawings in which:

FIGURE 1 schematically sets forth the novel cranking motor automatic disconnect circuit of this invention in combination with a conventional cranking motor energizing circuit, FIGURE 2 schematically sets forth an alternate embodiment of the novel circuit of this invention as used in the control circuit of a conventional cranking motor energizing circuit, FIGURE 3 is an alternate arrangement of the novel cranking motor automatic disconnect circuit set forth in FIGURES 1 and 2, FIGURES 4a, 4b and 4c are a set of curves useful in understanding the operation of the novel circuit of this invention and, FIGURE 5 is another curve helpful in understanding the operation of the novel circuit of this invention.

As the point of reference or ground potential is the same point electrically throughout the system, it has been illustrated by the accepted symbol and referenced by the numeral 10 in FIGURES 1, 2 and 3.

In FIGURES 1 and 2, wherein like elements have been given like characters of reference, the novel electric cranking motor automatic disconnect circuit of this invention is set forth schematically in combination with a conventional electric cranking motor, schematically represented and referenced by the numeral 12, and an internal combustion engine schematically represented in block form and referenced by the numeral 15. As conventional electric cranking motors and internal combustion engines are well known in the art and form no part of this invention, in the interest of reducing drawing complexity, each has been diagrammatically represented in FIGURES 1 and 2. Cranking motor 12 may be drivably engaged with gear 17 of engine 15 through any of the methods well known in the automotive art.

In FIGURE 1, cranking motor 12 is electrically connected across a direct current potential source, which may be a conventional storage battery 14, through line 16, the normally open contacts of an electric relay 18, which has an operating coil 19, the normally closed contacts of another electric relay 20, which has an operating coil 21, and point of reference or ground potential 10.

In FIGURE 2, cranking motor 12 is electrically connected across battery 14 through the normally open contacts of relay 18 and point of reference potential 10.

In the circuits schematically set forth in FIGURES 1 and 2, the normally open contacts of relay 18 are connected in series in the electrical circuit which electrically connects cranking motor 12 across the source of direct current potential, battery 14. As the contacts of relay 18 are in series in the energizing circuit for cranking motor 12, they must be of sufficient capacity to not only carry the heavy energizing current of cranking motor 12 but also to interrupt this current. An example of a relay of this type is a conventional automotive starter solenoid.

In FIGURE 1, operating coil 19 of relay 18 is electrically connected across the source of direct current potential, battery 14, through the movable contact 25 and stationary contact 27 of an electric switch 24 and point of reference or ground potential 10.

In FIGURE 2, operating coil 19 of relay 18 is electrically connected across battery 14 through the movable contact 25 and stationary contact 27 of electric switch 24, the normally closed contacts of relay 20 and point of reference or ground potential 10.

Switch 24 may be a conventional automotive type ignition switch having an open or "off" position, in which position it is shown in FIGURES 1 and 2, a "run" position when movable contact 25 is closed to stationary contact 26 and a "crank" position when movable contact 25 is closed to both stationary contacts 26 and 27. As is well known in the art, switches of this type are spring biased to automatically return to the "run" position whereis in movable contact 25 is closed to stationary contact 26 when the ignition key is released.

For proper operation of the automatic disconnect circuit of this invention, it is necessary to produce an electrical potential signal having a frequency which is a function of engine speed and to provide an electrically operable switching arrangement responsive to a predetermined frequency of this electrical potential signal which is equal to or greater than the frequency of this electrical potential signal which corresponds to the predetermined engine speed above which the cranking motor is not to be energized for interrupting the cranking motor 12 energizing circuit while the engine exceeds this predetermined speed.

One method of producing the required electrical potential signal is to at least half-wave rectify an alternating current potential having a frequency which is a function of engine speed.

In FIGURES 1 and 2, and without intention or inference of a limitation thereto, the source of alternating current potential having a frequency which is a function of engine speed is schematically set forth as a three-phase alternating current generator, generally shown at 28, which may be a conventional automotive type alternating current generator. As is well known in the art, the rotor 30, which has wound thereon electrically energizable windings, not shown, is rotated by the engine 15, usually through a belt such as the fan belt, and induces a three phase potential in the stator windings, herein shown as Y connected output windings 32. The three-phase alternating current output from stator windings 32 may be full-wave rectified by a three-phase full-wave diode bridge type rectifier circuit having a positive polarity direct current output terminal 34 and a negative polarity direct current output terminal 36. The negative polarity direct current output terminal 36 may be connected to point of reference or ground potential 10, as shown, and the positive polarity direct current output terminal 34 may be connected to a positive polarity potential line 38, as shown.

The electrical potential signal may be taken from the junction between any two diodes of the bridge rectifier circuit. The potential present at any one of these junctions, in respect to point of reference or ground 10, is the half-wave rectified potential of one of the phases of the three-phase alternating current potential induced in stator windings 32 and has a substantially square wave form as shown in FIGURE 4a. For purposes of illustrating the features of this invention, the potential appearing at junction 42 between diodes 43 and 44 of the diode bridge rectifier circuit has been selected as the electrical potential signal. It is to be understood that either of the other two junctions may be selected for this purpose.

The electrically operable switching arrangement which is responsive to the frequency of the electrical potential signal must operate to interrupt the electrical energizing circuit for cranking motor 12 and may be comprised of a normally conducting, electrically operable electrical circuit switching device in combination with a frequency sensitive electrical circuit.

In FIGURES 1 and 2, and without intention or inference of a limitation thereto, this electrically operable electrical circuit switching device has been shown to be relay 20 having two normally closed contacts and an operating coil 21 and the frequency sensitive electrical circuit is comprised of a capacitor 40 and a diode 41.

In both FIGURES 1 and 2, one end of operating coil 21 of relay 20 is connected to the negative output terminal 36 of the diode bridge rectifier circuit through point of reference or ground potential 10. Capacitor 40 is connected between the other end of operating coil 21 and junction 42 between diodes 43 and 44 of the bridge rectifier circuit. Diode 41 is connected in shunt across operating coil 21, as shown.

In operation, the movable contact 25 of switch 24 of FIGURE 1 is closed to stationary contacts 26 and 27. In this position, operating coil 19 of relay 18 is energized to close the normally open contacts thereby establishing an energizing circuit for cranking motor 12 which begins to crank engine 15 and drive rotor 30 of the alternating current generator 28.

In this position of switch 24, an energizing circuit for operating coil 46 of relay 48 is also established and relay 48 operates to close its normally open contacts. With the normally open contacts of relay 48 closed, an electrical energizing circuit across battery 14 for the electrical windings, not shown, wound upon rotor 30 is established. As the rotational engine speeds are low during cranking, the frequency of the alternating current potential induced in windings 32 is low and, therefore, the frequency of the electrical potential signal appearing at junction 42, which is a half-wave rectified potential of a selected phase of the three-phase alternating current potential induced in windings 32, is of a low frequency, as shown in FIGURE 4a.

When the electrical potential signal at junction 42 is of a positive polarity, a charging current flows through capacitor 40 and the operating coil 21 of relay 20 which charges capacitor 40 to the peak potential available at junction 42. The current through operating coil 21 of relay 20, therefore, rises to a peak value and decreases to zero as capacitor 40 becomes fully charged, as is shown in FIGURE 4b. When the electrical potential signal returns to zero at the end of each positive excursion, capacitor 40 discharges through two of the windings of generator 28, one of the positive diodes other than diode 43 of the bridge rectifier circuit, line 38, battery 14, point of reference potential 10 and diode 41 and, therefore, is in a condition to accept another charge during the next positive excursion of the electrical potential signal.

At low engine speeds and consequently, low electrical potential signal frequencies, the average current flowing through operating coil 21 of relay 20 is very low because of the low repetition rate of the charging pulses, as is shown in FIGURE 4b. This average current is of an insufficient magnitude to operate relay 20 at these low engine speeds.

At higher engine speeds and, consequently, higher electrical potential signal frequencies, the average current flowing through operating coil 21 of relay 20 increases because of the increased repetition rate of the charging pulses, as is shown in FIGURE 4c. This increase of average current is aided by the inductive action of operating coil 21 which prevents the current from falling to zero between pulses at this higher frequency.

From this description, it is apparent that the capacitor 40 diode 41 network passes an average current through operating coil 21 of relay 20 which increases with frequency of the electrical potential signal, hence engine speed.

When this average current reaches a value of sufficient magnitude to operate relay 20, the associated normally closed contacts are opened and interrupt the energizing circuit for cranking motor 12. Relay 20 will remain in the operated condition as long as the engine is running, thus preventing inadvertent re-engagement of the cranking motor with the gear 17 of engine 15.

The curve of FIGURE 5 graphically shows the increase of average current through operating coil 21 of relay 20 with increases of engine speed. As the average charging current through the capacitor 40 diode 41 network continues to increase with engine speed beyond the operating point of relay 20, the resistance of relay winding 21 functions as a current limiting resistor and tends to maintain the average charging current at a substantially constant value with further increases of engine speed, such as occur during normal running of the engine. This action prevents the capacitor 40 from charging to full potential during each positive excursion of the electrical potential signal and, therefore, prevents overheating of the capacitor 40, diode 41 and operating coil 21 at normal engine running speeds.

By adjusting the relay contact spring tension or by altering the operating coil current requirement for operating relay 20 by various methods well known in the art, the electrically operable switching arrangement may be adjusted to be responsive to a frequency of the electrical potential signal which is equal to or greater than the frequency which corresponds to the predetermined engine speed above which the cranking motor energizing circuit is not to be energized. Therefore, the novel circuit of this invention may be adjusted to be responsive to a frequency equal to or greater than a predetermined frequency of the electrical potential signal to interrupt the cranking motor energizing circuit while the engine exceeds a predetermined speed.

In the circuit of FIGURE 1, the operation of relay 20 to open the associated normally closed contacts interrupts directly the energizing circuit for cranking motor 12. Therefore, with this arrangement, the contacts of relay 20 must be rated to carry and to interrupt the energizing current of cranking motor 12.

In the circuit of FIGURE 2, the operation of relay 20 to open the associated normally closed contacts indirectly interrupts the energizing circuit for cranking motor 12 by interrupting the energizing circuit of operating coil 19 of relay 18. With the interruption of the energizing circuit for operating coil 19, the associated normally open contacts of relay 18 open to interrupt the energizing circuit of cranking motor 12. With this arrangement, the normally closed contacts of relay 20 interrupt only the energizing current of operating coil 19 of relay 18 and, therefore, may be of a much lower current rating.

With the arrangement of either FIGURE 1 or FIGURE 2, however, the electrically operable switching arrangement operates to interrupt the energizing circuit for the cranking motor while the engine exceeds a predetermined speed.

The electrical potential signal appearing at junction 42 may be amplified by a transistor device which would permit a reduction in rating of capacitor 40 and diode 41. This alternate arrangement is shown in FIGURE 3 wherein a type NPN transistor 50 having the usual base 51, emitter 52 and collector 53 electrodes is employed as a current amplifier. With this arrangement, the normally closed contacts of relay 20 may be connected as shown in either FIGURE 1 or FIGURE 2, one end of operating coil 21 of relay 20 is connected to output terminal 36 of the diode bridge rectifier circuit through point of reference or ground potential 10 and the current carrying or emitter-collector electrodes of transistor 50 are connected in series between the other end of operating coil 21 of relay 20 and junction 42 between diodes 43 and 44 of the bridge rectifier circuit. The series combination of capacitor 40 and diode 41 is connected in shunt across the series combination of the current carrying electrodes of transistor 50 and operating coil 21 of relay 20. The base or control electrode 51 of transistor 50 is connected to the junction between capacitor 40 and diode 41.

With each positive excursion of the electrical potential signal at junction 42, the following sequence of events is repeated. Transistor 50, with the collector electrode 53 connected to junction 42 and the emitter electrode 52 connected to point of reference potential 10 through operating coil 21, is forward poled and capacitor 40 begins to charge through a circuit which may be traced from junction 42, through capacitor 40, the base-emitter junction of transistor 50, operating coil 21 and point of reference or ground potential 10 to negative polarity terminal 36 of the diode bridge rectifier circuit.

The capacitor 40 charging current supplies the base-emitter current through transistor 50 which triggers this device to conduction. Initially, transistor 50 is conducting in a substantially saturated condition and continues to conduct in a progressively decreasing degree during the period of time required to charge capacitor 40. When capacitor 40 has received substantially a full charge, the charging current is reduced to a value of insufficient magnitude to maintain transistor 50 conducting, therefore, transistor 50 goes nonconductive, and the base 51 and emitter 52 electrodes thereof are at substantially the same potential, a condition which maintains transistor 50 in a nonconducting state over the remainder of the positive excursion of the electrical potential signal appearing at junction 42. As an energizing current pulse flows through coil 21 while transistor 50 is conducting, the time constant of the charging circuit for capacitor 40 should be of such a value that capacitor 40 receives substantially a full charge in a period of time less than the time required for this energizing current pulse to produce sufficient ampere turns in relay coil 21 to operate relay 20.

When the potential of junction 42 falls to substantially ground potential, capacitor 40 discharges through two of the windings of generator 28, one of the positive diodes other than diode 43 of the bridge rectifier circuit, positive polarity potential line 38, battery 14, point of reference or ground potential 10 and diode 41. As the time constant of this circuit is ertremely short, capacitor 40 discharges quickly and is prepared to receive another charge during the next positive excursion of the electrical potential signal appearing at junction 42.

Because of the difference in time constants of the charging circuit for capacitor 40 and the energizing circuit for operating coil 21, at low engine speeds and, consequently, low electrical signal potential frequencies, transistor 50 is not conductive long enough during each positive excursion of the electrical potential signal to produce sufficient ampere turns in operating coil 21 to operate relay 20.

At higher engine speeds and, consequently, higher electrical potential signal frequencies, the repetition rate of the sequence of events hereinabove described is increased. At this greater repetition rate, the rate of energizing current pulses flowing through operating coil 21 of relay 20 increases because transistor 50 conducts more frequently, is conductive over a greater portion of each positive excursion of the reference potential, and the inductance of operating coil 21 prevents the current flow from reducing to zero between pulses. Therefore, the average energizing current flow through operating coil 21 of relay 20 increases in magnitude with increased electrical signal potential frequencies.

When this average energizing current reaches a value of sufficient magnitude to operate relay 20, the associated normally closed contacts are opened to interrupt the energizing circuit for operating coil 19 of relay 18, in the embodiment of FIGURE 2, the associated normally open contacts of which interrupt the energizing circuit for starting motor 12, or to interrupt the energizing circuit for cranking motor 12 in the embodiment of FIGURE 1.

Throughout the specification, specific circuitry, connections and components have been set forth to produce the electrical potential signal and to provide the proper frequency sensitive switching action to interrupt the energizing circuit of the cranking motor. It is to be specifically understood that alternate circuits, connections, methods and components providing similar electrical characteristics may be substituted therefor without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. An electric cranking motor automatic disconnect circuit comprising in combination with an electric cranking motor and an engine which may be cranked thereby, a direct current potential source, a first electric relay having an operating coil and at least two normally open contacts, first electrical circuit means for connecting said cranking motor and said normally open contacts in series across said direct current potential source, second electrical circuit means for connecting said operating coil of said first electric relay across said direct current potential source, means for producing an electrical potential signal having a frequency which is a function of engine speed, a second electric relay having an operating coil and at least two normally closed contacts, means for connecting said normally closed contacts in series in said first electrical circuit means, a capacitor, a diode, means for applying said electrical potential signal across the series combination of said capacitor and said second electric relay operating coil and means for connecting said diode in shunt across said second electric relay operating coil.

2. The electric cranking motor automatic disconnect circuit as described in claim 1 wherein said normally closed contacts of said second electric relay are connected in series in said second electrical circuit means.

3. An electric cranking motor automatic disconnect circuit comprising in combination with an electric cranking motor and an engine which may be cranked thereby, a direct current potential source, a first electric relay having an operating coil and at least two normally open contacts, first electrical circuit means for connecting said cranking motor and said normally open contacts in series across said current potential source, second electrical circuit means for connecting said operating coil of said first electric relay cross said direct current potential source, means for producing an electrical potential signal having a frequency which is a function of engine speed, a second electric relay having an operating coil and at least two normally closed contacts, means for connecting said normally closed contacts in series in said first electrical circuit means, a capacitor, a diode, a semi-conductor device having two current carrying electrodes and a control electrode, means for connecting the said current carrying electrodes of said semi-conductor device in series with said second electric relay operating coil, means for connecting the series combination of said capacitor and said diode in parallel with the series combination of said current carrying electrodes of said semi-conductor device and said second electric relay operating coil, means for connecting said control electrode of said semi-conductor device to the junction between said capacitor and diode and means for applying said electrical potential signal across the parallel combination of said series connected capacitor and diode and said series connected current carrying electrodes and second relay operating coil.

4. The electric cranking motor automatic disconnect circuit as described in claim 3 wherein said normally closed contacts of said second electric relay are connected in series in said second electrical circuit means.

References Cited

UNITED STATES PATENTS

| | | | |
|---|---|---|---|
| 1,989,057 | 1/1935 | Kongsted | 290—36 |
| 2,492,540 | 12/1949 | Smith | 322—32 |
| 2,542,638 | 2/1951 | Desch | 322—32 XR |
| 2,668,247 | 2/1954 | Short et al. | 290—37 XR |
| 2,866,150 | 12/1958 | Lewis | 322—32 |
| 2,952,782 | 9/1960 | Woyden | 290—37 |
| 2,975,296 | 3/1961 | Dominguez-Rego. | 290—38 |
| 3,038,306 | 6/1962 | Loft | 60—39.14 |
| 3,182,648 | 5/1965 | Schneider et al. | 123—148 |
| 3,310,937 | 3/1967 | Smith | 60—39.13 |

BENJAMIN DOBECK, *Primary Examiner.*

G. R. SIMMONS, *Assistant Examiner.*

U.S. Cl. X.R.

60—39.14; 322—32